(12) United States Patent
Kiil et al.

(10) Patent No.: US 12,017,847 B2
(45) Date of Patent: Jun. 25, 2024

(54) COOLING/INTERMODAL CONTAINER, method OF ASSEMBLING A COOLING/INTERMODAL CONTAINER AND EXTRUDER HEAD

(71) Applicant: MAERSK CONTAINER INDUSTRY A/S, Tinglev (DK)

(72) Inventors: Hans-Erik Kiil, Sønderborg (DK); Lars Lübker, Haderslev (DK)

(73) Assignee: MAERSK CONTAINER INDUSTRY A/S, Tinglev (DK)

(*) Notice: Subject to any disclaimer, the term of this patent is extended or adjusted under 35 U.S.C. 154(b) by 646 days.

(21) Appl. No.: 17/266,036

(22) PCT Filed: Aug. 12, 2019

(86) PCT No.: PCT/EP2019/071617
§ 371 (c)(1),
(2) Date: Feb. 4, 2021

(87) PCT Pub. No.: WO2020/035459
PCT Pub. Date: Feb. 20, 2020

(65) Prior Publication Data
US 2021/0309451 A1    Oct. 7, 2021

(30) Foreign Application Priority Data
Aug. 16, 2018   (DK) .......................... PA 2018 70528

(51) Int. Cl.
*B65D 90/08*   (2006.01)
*B29C 48/155*  (2019.01)
(Continued)

(52) U.S. Cl.
CPC ............ *B65D 90/08* (2013.01); *B29C 48/155* (2019.02); *B29C 48/34* (2019.02); *B29C 66/43421* (2013.01); *B65D 2590/02* (2013.01)

(58) Field of Classification Search
CPC ..................... B65D 90/08; B65D 2590/02; B29C 48/1551; B29C 48/34; B29C 66/43421
(Continued)

(56) References Cited

U.S. PATENT DOCUMENTS 4,562,934 A    1/1986  Hammond
4,741,453 A *  5/1988  Stolzman .............. B65D 45/32
                                              229/5.7
(Continued)

FOREIGN PATENT DOCUMENTS

CN    2677333 Y    2/2005
CN    2690343 Y    4/2005
(Continued)

OTHER PUBLICATIONS

Chinese Office Action and Search Report dated Apr. 26, 2022 for Chinese Application No. 201980055131.0.
(Continued)

*Primary Examiner* — J. Gregory Pickett
*Assistant Examiner* — Niki M Eloshway
(74) *Attorney, Agent, or Firm* — EIP US LLP (57) ABSTRACT

The invention relates to a cooling container e.g. a refrigerated cargo box of a truck or trailer, a railway container, an intermodal container or a shipping container comprising panels to be connected, having at least one connection between panels (10, 40) comprising a layer of overmoulding material (14), where a panel (10, 40) at least partially is covered on a first side (100) and a second side (200) by the overmoulding material (14). The invention further relates to a method of assembling a cooling container e.g. a refrigerated cargo box of a truck or trailer, a railway container, an intermodal container or a shipping container comprising panels to be connected, where at least one panel (10, 40) is provided with an overmoulding zone (11) comprising a layer (Continued)

of overmoulding material (14) covering at least partially a first side (100) and a second side (200) of the panel (10, 40). The invention also relates to an extruder head for applying a layer of a fluid overmoulding material, a container comprising panels (10, 40) comprising a layer of overmoulding material (14).

13 Claims, 10 Drawing Sheets

(51) Int. Cl.
*B29C 48/34* (2019.01)
*B29C 65/00* (2006.01)

(58) Field of Classification Search
USPC ....... 220/680, 656, 657, 658, 659, 640, 641, 220/642, 643, 644
See application file for complete search history.

(56) References Cited

U.S. PATENT DOCUMENTS

| | | | | |
|---|---|---|---|---|
| 5,131,557 | A * | 7/1992 | Stolzman | B65D 45/345 220/782 |
| 5,160,061 | A * | 11/1992 | Stolzman | B29C 66/5344 229/5.5 |
| 5,215,207 | A * | 6/1993 | Stolzman | B29C 66/3024 229/5.5 |
| 5,259,526 | A * | 11/1993 | Stolzman | B65D 47/121 206/508 |
| 5,292,026 | A * | 3/1994 | Stolzman | B65D 45/345 220/792 |
| 6,823,624 | B2 * | 11/2004 | Proserpio | B29C 45/1657 47/65.5 |
| 8,235,217 | B2 * | 8/2012 | Stolzman | B65D 19/18 220/4.28 |
| 2005/0103792 | A1 * | 5/2005 | Sagol | F16B 17/008 220/642 |
| 2006/0191095 | A1 | 8/2006 | Buchanan, Jr. | |
| 2010/0072211 | A1 * | 3/2010 | Dickinson | B65D 81/052 220/62.15 |
| 2010/0215425 | A1 | 8/2010 | Huang et al. | |
| 2017/0137216 | A1 | 5/2017 | Gram | |
| 2018/0215509 | A1 * | 8/2018 | Shoop | B65D 25/34 |

FOREIGN PATENT DOCUMENTS

| | | |
|---|---|---|
| CN | 200948950 Y | 9/2007 |
| CN | 201305279 Y | 9/2009 |
| CN | 202828607 U | 3/2013 |
| CN | 103264855 A | 8/2013 |
| CN | 203186907 U | 9/2013 |
| CN | 105518375 A | 4/2016 |
| DE | 3248705 A1 | 7/1983 |
| EP | 1602597 B1 | 12/2006 |
| EP | 2927159 A2 | 10/2015 |
| FR | 1156573 A | 5/1958 |
| FR | 2581587 A1 | 11/1986 |
| GB | 1341559 A | 12/1973 |
| GB | 1376673 A | 12/1974 |
| GB | 2273542 A | 6/1994 |
| WO | 8502895 A1 | 7/1985 |
| WO | 2005016724 A1 | 2/2005 |
| WO | 2015197681 A1 | 12/2015 |

OTHER PUBLICATIONS

Danish Search Report dated Feb. 25, 2019 for Danish Application No. PA 2018 70528.
PCT Partial International Search report dated Sep. 25, 2019 for PCT Application No. PCT/EP2019/071617.
PCT International Search report and Written Opinion dated Nov. 22, 2019 for PCT Application No. PCT/EP2019/071617.
PCT International Preliminary report on Patentability dated Feb. 16, 2021 for PCT Application No. PCT/EP2019/071617.

* cited by examiner

Fig. 19 though the connections means less repair activities during the lifetime of the container.

COOLING/INTERMODAL CONTAINER, method OF ASSEMBLING A COOLING/INTERMODAL CONTAINER AND EXTRUDER HEAD

CROSS-REFERENCE TO RELATED APPLICATIONS

This application is a 371 of International Application No. PCT/EP2019/071617, filed Aug. 12, 2019, which claims priority to Danish Application No. PA 2018 70528, filed Aug. 16, 2018 under 35 U.S.C. § 119(a). Each of the above-referenced patent applications is incorporated by reference in its entirety.

The invention relates to a cooling container e.g. a refrigerated cargo box of a truck or trailer, a railway container, an intermodal container or a shipping container comprising panels to be connected.

The invention further relates to a method of assembling a cooling container e.g. a refrigerated cargo box of a truck or trailer, a railway container, an intermodal container or a shipping container comprising panels to be connected.

The invention further relates to an extruder head for applying a layer of a fluid overmoulding material, the extruder head comprising an inlet for supply of overmoulding mass to the extruder head and a chamber for applying overmoulding material to an elongate member.

The invention further relates to a container comprising a pair of sidewalls, a ceiling, a floor, an end wall and a door opening, the sidewalls comprising wall panels and the ceiling comprising roof panels.

Connections between metallic side panels or linings and polymer or metallic roof panels or linings in containers are commonly made by use of rivets, which is mounted through holes in the linings.

The side panel can be bended 90 degree at top and assembled directly to the roof panel by rivets or an extra corner profile can be mounted and riveted to the roof panel as well as to the side panel. The rivets provides mechanical strength to the corner connection. To achieve sufficient tightness for air and water for the connection, one or more gaskets or a sealant are applied.

The mechanical strength of the rivet connections is limited by the strength of the single rivet and by the limited number of rivets. The limited number of rivets is related to the cost for mounting rivets. A large number of rivets will give more possibilities for bacterial growth.

The riveted connection is usually provided with a gasket to achieve a tight connection, however rough and non-flat surfaces of the plates may bring leakage through the connections as well as aging of gaskets also can be a source of increase in leakage.

The non-flat surfaces of the rivets, the gaskets and sealants as well as slits between linings and rivets, gaskets and sealants may bring challenges related to keeping a high hygienic standard during use of the containers, as the surfaces of a riveted connection is challenging to clean and the surfaces includes places for bacteria to grow.

The assembly process for the riveted solutions, including mounting the gaskets or applying sealant plus mounting and pulling the rivets is labour intensive operations, which brings significant production costs as well as quality control of the processes is challenging.

The invention brings the possibility to produce containers without any rivets being part of the corner assemblies or assemblies of the container in general, which brings a more hygienic container, a more gas tight and more water tight container as well as the invention brings a container being more robust towards impact forces. The higher impact strength of the connections means less repair activities during the lifetime of the container.

From WO 2015/197681 A1 a cargo transportation container is known, where the inside of the container is lined with plates, typical the side walls are lined with metal plates and the ceiling is lined with plates made of a polymer based material. The metal plates and the plates of polymer-based material are joined together by a connecting plate. The connecting plates typically are made of a polymer-based material but can also be made of metal. To join the metal plates and the plates of polymer-based material, an intermediate layer is used. The intermediate layer is capable of adhering to metals and plastics when heated.

The problem to be solved is to provide a connection with a smooth transition between two panels.

A panel will in this application be understood as a plate or sheet forming an inner or outer part of a wall, a ceiling/roof or a floor. The inner or outer part of the wall, ceiling/roof or floor can be formed by one panel or by more panels fastened to each other. The inner part should be understood as the part being inside the cooling container and the outer part should be understood as the part being on the outer side of the cooling container.

The same apply when providing a corner connection with a smooth transition from the connection plate to the side wall and to the ceiling and at the same time to achieve sufficient mechanical strength and sealing of the assembly.

This can be achieved by at least one connection between panels comprising a layer of overmoulding material along an edge, where a panel at least partially is covered on a first side and a second side by the overmoulding material.

In an embodiment, the overmoulding material is a polymer.

In an embodiment, the panel is perforated, letting the overmoulding material on the first side of an edge of the panel merge with the overmoulding material on the second side of the edge of the panel through holes of the perforation.

In an embodiment, the panel is perforated in a pattern of elongate holes.

In an embodiment, the panel is perforated in a pattern of circular holes.

In an embodiment, the holes are arranged in more than one row.

In an embodiment, the holes are arranged in a first and a second row, where the second row is displaced in relation to the first row in such a way that a centre or middle of a hole in the second row is placed aligned with a middle distance between holes placed in the first row.

In an embodiment, the holes arranged in the second row is displaced in relation to the first and a third row, In an embodiment, the overmoulding material is placed along an edge of the panel.

In an embodiment, at least one of the panels is made of metal.

In an embodiment, at least one of the panels is made of a polymer material.

In an embodiment, at least one of the panels is made of a composite material.

In an embodiment, the connection is a corner connection between a side panel and a roof panel.

The solution can also be achieved by a method of assembling cooling container e.g. a refrigerated cargo box of a truck or trailer, a railway container, an intermodal container or a shipping container comprising panels to be connected, where at least one panel is provided with an overmoulding zone comprising a layer of overmoulding material covering at least partially a first side and a second side of the panel.

In an embodiment, this is further achieved by providing perforations or holes to the overmoulding zone before overmoulding the zone with the overmoulding material.

In an embodiment, the overmoulding material flows through the holes in the panel during application and is distributed on each side of the panel.

Hereby a better and stronger connection between the panel and the overmoulding material is achieved.

In an embodiment, the perforations or holes are provided to the overmoulding zone before overmoulding the zone with the overmoulding material.

In an embodiment of the method of assembling, the connection is carried out by joining an inner side panel and a roof panel to a corner profile by gluing or plastic welding.

In an embodiment, the method is carried out by one of an inner side panel or a roof panel is bended before or after the panels are provided with a layer of overmoulding material to provide parallel and overlapping overmoulding zones before joining the inner side panel and the roof panel by gluing or plastic welding.

In an embodiment, the method is carried out by bending one of an inner side panel or a roof panel providing parallel and overlapping overmoulding zones before joining the inner side panel and the roof panel by overmoulding.

Hereby it is possible to join inner side panels, roof panels or inner side panels with roof panels in a corner connection without using a separate corner profile.

The connection can have varying strength depending on the material properties for the overmoulding material chosen and of the size and shape of the perforations, being elongate holes, circular holes, quadratic or rectangular holes or combinations of these shapes of holes.

A suitable material for the overmoulding material can be a polymer.

Typical suitable polymer materials are polypropylene(PP) and PP blends, however many alternative types of polymer and polymer blends can be chosen for a specific design to fulfil the requirements for strength, visual impression, biocompatibility, regulations for food transport equipment etc.

By optimization of the area of the perforations, the shapes of the perforations and the properties of the polymer material, the strength of the new connection typically exceeds the strength of a comparable rivet based corner connection by a factor of 2 to 5.

As an advantage, cost for production of the new corner connection is significantly reduced compared to similar comparable alternative corner connections, as material costs is reduced by use of polymer only for the connection and as the cost for assembly of the corner connection is reduced.

Reduced cost for assembly of the corner connection is much related to the reduced number of parts to be assembled and to the fact that the polymer overmoulding process may be carried out as a relative simple direct extrusion process with limited use of labour hours.

The overmoulding process can be performed by direct extrusion of the overmoulding material together with the edge and overmoulding zone of the panel being led through an extrusion crosshead.

Extruder equipment and extrusion process is standard equipment also typically used for welding polymer parts together. Therefore, only the extruder head has to be adapted to the process i.e. shape of internal flow channels and shape of exit of the extruder head must be designed specifically for actual design/shape of the applied layers of polymer on to the overmoulding zone the panel. The extruder head can be a standard base component of PTFE in which the shape of the extruded profile is machined.

The solution can also be achieved by an extruder head for applying a layer of a fluid overmoulding material, the extruder head comprising an inlet for supply of overmoulding mass to the extruder head and a chamber for applying overmoulding material to an elongate member, where the extruder head is provided with an entrance formed to receive a plate or panel on which panel a layer of overmoulding mass is applied, forming a strip of overmoulding material on the panel.

Overmoulding a zone/a part of a panel with a layer of overmoulding material on a first side and a second side along an edge of the panel forms a mechanical connection between the overmoulding material and the panel.

In an embodiment where the panel is provided with a number of perforations or holes in one or more rows placed in the overmoulding zone, the overmoulding material forms a mechanical connection between the overmoulding material and the panel as well as in the holes of the panel.

When the panels are formed by metallic plates, being the inner side panel and the roof panel, the panels can be connected mechanically by placing each strip of overmoulded material from the inner side panel and the roof panel against each other, welding together the two strips of overmoulding material being polymer. The two polymer strips can be directly welded together or an extra polymer component/an extra polymer profile can be interconnected between the two polymer strips.

The inner side panel and the roof panel can also be made of polymer plates or composite plates, however the possible ranges for strength and dimensions and shapes of perforations need to be adapted to the actual type of material and thickness of plates.

The function of the assembly is to mechanically connect the edges of two plates being the inner panels of a container to each other, this mechanical connection having the needed strength and at same time the needed tightness and being hygienic optimal.

An advantage of the polymer based corner connection is that the welded polymer brings high degree of tightness and a smooth surface, which is easy to clean and is hygienic, and at same time the relative limited thickness of the overmoulded polymer strip brings the strength and toughness needed for the corner connection. Overmoulding a panel with the polymer forms a firm connection between the polymer and the panel when the polymer is cured an adheres to the panel. Further, the overmoulding together with welding two polymer strips of two panels together forms a connection where any imperfections in surfaces of the polymer or the panels are minimised or eliminated.

Regarding tightness, performance of the connection depends among other things on the type of polymer chosen, as soft polymer will tend to tighten better against the panels than hard polymer.

The principle could however also be the base for doing the connections of the inner panels at the other edges of the inner panels in a reefer container. This could be the vertical connection of the side panels to the container structure front and rear and this could be the horizontal connection of the top panel to the container structure front and rear. Potentially the principle could be used all places in the inside of the container, where two plates being the inner panel or other plates are to be connected mechanically or all places on the outer side of the container, where two plates or panels are to be connected mechanically.

Further, the principle can be used for connecting a panel directly to a mechanical frame of the container.

The corner connection may also be applied in other similar types of transport units for transport on rail, road or sea, such as reefer trailers or in stationary storing units.

Overmoulding of the panels with polymer is here described and based on standard polymer blends as for example Polypropylene. The principle can be practiced with many alternative types of polymers, however for the reefer containers the polymers need be food grades and need be for low temperature application.

Overmoulding the perforated panels or plates, which forms the mechanical connection can be combined with the concept of applying special polymer grades having high level of adhesion to the surfaces of the metallic plates, and by combining the concepts of mechanical connection by overmoulding perforations with the application of adhesive polymer grades the strength as well as the tightness of the connection will be improved.

Various types of adhesive polymers, either with additional gluing components such as variants of Thermo Plastic Elastomers (TPE) or with additional additives for vulcanizing to the surface of the plates such as Thermo Plastic Vulcanize (TPV) can be used.

These features eliminates use of rivets and gaskets/sealants for connecting the panels in a container.

The solution can also be achieved by an intermodal container, truck or railway wagon comprising a pair of side walls, a ceiling, a floor, an end wall and a door opening, the side walls comprising wall panels and the ceiling comprising roof panels, where wall panels and/or the roof panels are joined together by a connection according to one or more of embodiments relating to the connection of panels described above.

The solution can also be achieved by a method of assembling a container by use of the method according to one or more embodiments mentioned above.

The above and other features and advantages of the present invention will become readily apparent to those skilled in the art by the following detailed description of exemplary embodiments thereof with reference to the attached drawings, in which.

Various embodiments are described hereinafter with reference to the figures. Like reference numerals refer to like elements throughout. Like elements will, thus, not be described in detail with respect to the description of each figure.

It should also be noted that the figures are only intended to facilitate the description of the embodiments.

They are not intended as an exhaustive description of the claimed invention or as a limitation on the scope of the claimed invention. In addition, an illustrated embodiment needs not have all the aspects or advantages shown.

An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
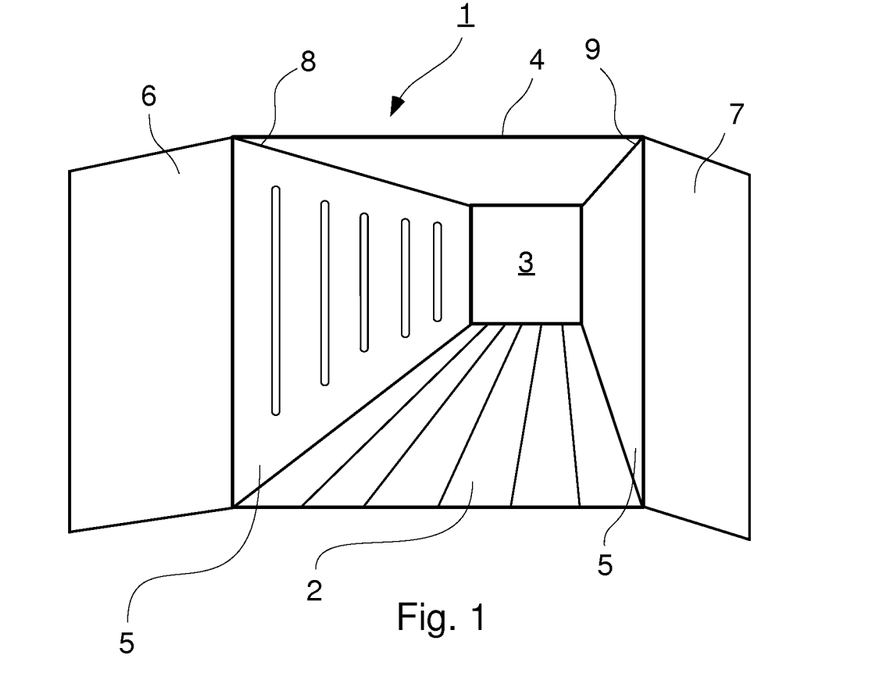
FIG. 1 shows a schematic view inside a reefer container.

A cooling container such as a refrigerated cargo box of a truck or trailer, a railway container, an intermodal container or a shipping container 1 shown in FIG. 1, comprises a floor 2, an end wall 3 and a roof panel 40 forming a ceiling 4 in the container 1, a pair of opposite side walls 5 and an open end closable by a pair of doors 6, 7. In the end wall 3, normally a reefer machine (not shown) is integrated.

In a transition between the sidewalls 5 and the roof panel 40 inside the container 1, inner top corner connections 8, 9 are provided.

In order to avoid riveting in connections between panels and in the inner top corner connections 8, 9 in the container 1, a new solution comprises overmoulding of panels or of parts of an inner top corner connection 8, 9.

This is achieved by at least one connection between panels 10, 40 comprising a layer of overmoulding material 14, where a panel 10, 40 at least partially is covered on a first side 100 and a second side 200 by the overmoulding material 14.

The sidewalls 5 are provided with inner side panels 10. The inner side panels 10 are provided with an overmoulding zone 11, which zone is placed along an edge 12 of the side panel 10. In the overmoulding zone 11 of the side panel one or more row of holes 13 is formed. Examples of inner side panels 10 are shown in FIGS. 2 to 8. In the following overmoulding inner side panels are explained, but the panels could be roof panels 40 or other panels in the container 1 or on the outside of the container 1 as well, for example door panels or outer wall panels.

The purpose with the one or more rows of holes 13 is to secure a good attachment of an overmoulding material 14 to the overmoulding zone 11 of the side panel 10.

When the panel 10, 40 is perforated, it is possible for the overmoulding material 14 on the first side 100 of an edge 12 of the panel 10, 40 to merge with the overmoulding material 14 on the second side 200 of the edge 12 of the panel 10, 40 through holes 13 of the perforation.

Figure 8:
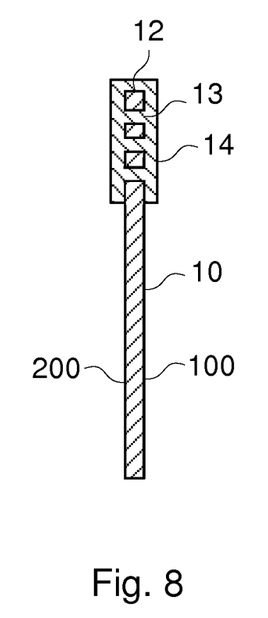
FIG. 8 shows a cross section of an inner panel indicating an overmoulded zone having three rows of holes.

In FIG. 8, a cross section through an embodiment of an inner panel 10 having three rows of elongate holes 13 schematically shows that the overmoulding material 14 is distributed at each side, being a first side 100 and a second side 200 of the inner panel 10 at the overmoulding zone 11 and that the overmoulding material 14 flows through the holes 13 in the inner panel 10 forming a uniform element surrounding an edge 12 of the inner panel 10.

The feature that the overmoulding material 14 flows through the holes 13 in the inner panel 10 during application and is distributed on each side of the inner panel 10 before it hardens ensures a very good attachment of the overmoulded material 14 to the inner panel 10.

In a similar way it is possible to provide the roof panel 40 with an overmoulding zone 11, which zone is placed along an edge 12 of the roof panel 40 to be placed adjacent to another roof panel or adjacent to the inner side panels 10. Hereby an overmoulding zone 11 is provided at each side being the first and second side of the roof panel 40, the overmoulding zone pointing towards an inner side panel 10. In the overmoulding zones 11 of the roof panel one or more rows of holes 13 are formed.

The overmoulding zones 11 of the inner side panels 10 and the roof panel 40 can in an embodiment be joined by a corner profile 15.

The inner side panels 10 and the roof panel 40 can be metal plates and the holes 13 can be provided by punching, drilling or by other material removing machining processes.

The corner profile 15 can be made of polymer or another suitable plastic material. The material being used for the corner profile 15 is suitable for bonding with the material used as overmoulding material 14.

Figure 2:
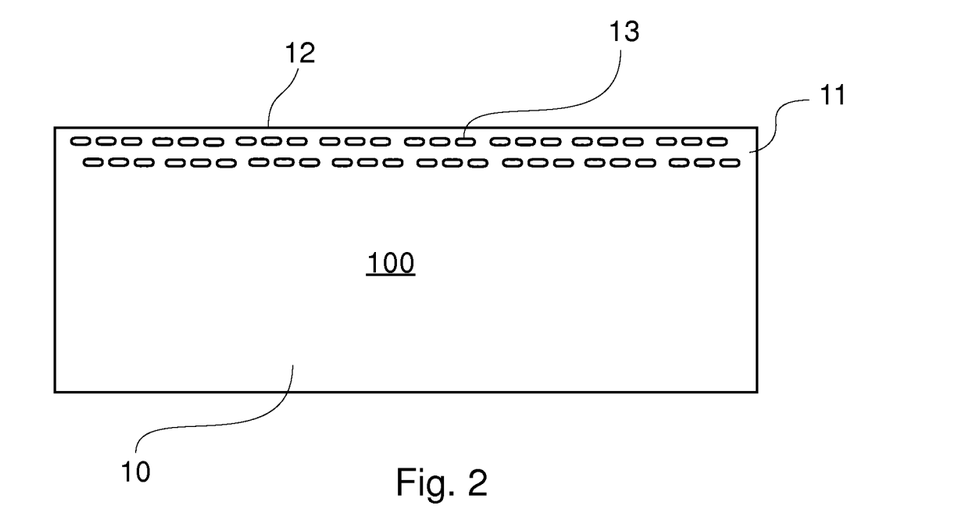
FIG. 2 shows an inner panel with perforations along an edge.
Figure 3:
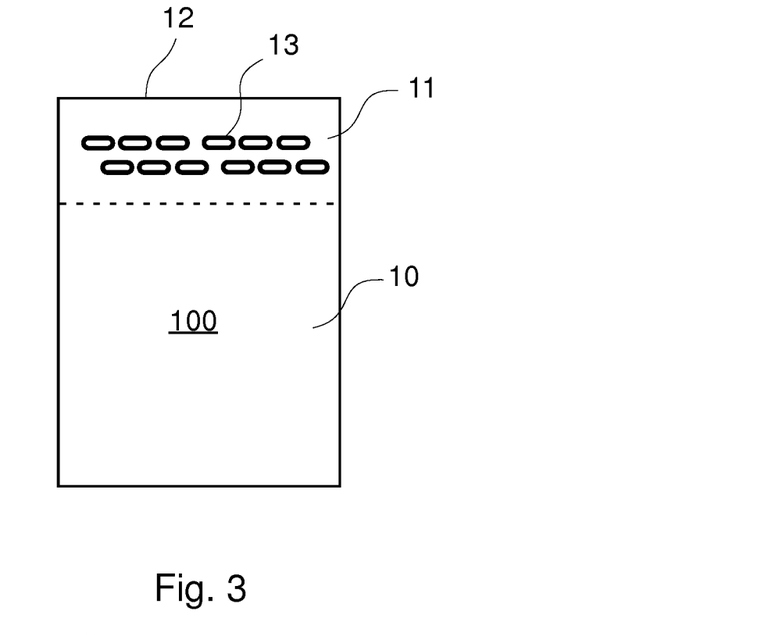
FIG. 3 shows schematically a part of an inner panel with oblong or elongated perforations.
Figure 4:
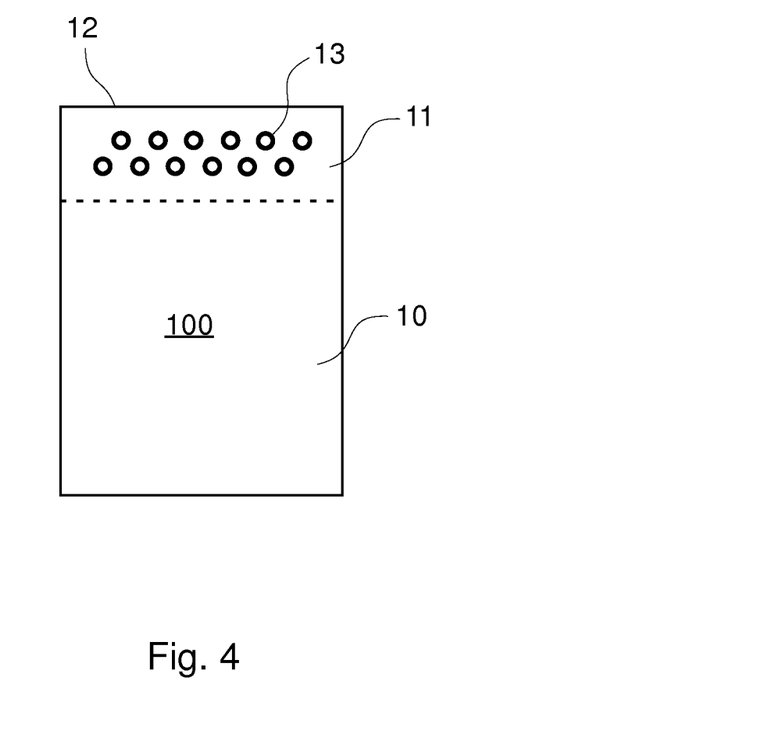
FIG. 4 shows schematically a part of an inner panel with circular holes.

As an example, an overmoulding zone 11 can be placed e.g. 50 mm from an edge of the inner side panel 10 or the roof panel 40. In the overmoulding zone 11, a pattern of perforations is made in shape of two rows of elongate holes. This embodiment is illustrated in FIG. 2.

This zone of perforated plate is overmoulded with an overmoulding material 14 in such a way that in this zone there is overmoulded material 14 on both sides of the plate or panel 10, 40 and the overmoulding material 14 on the two sides is mechanically connected through the perforations or holes 13 in the panels 10, 40 as indicated in FIG. 8.

The solution can also be used to join wall panels 10 to other wall panels 10 and roof panels 40 to other roof panels 40.

Figure 9:
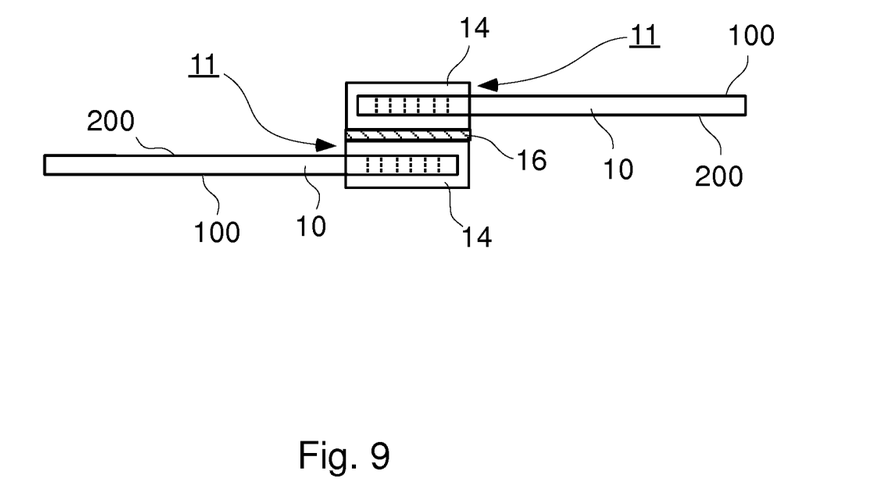
FIG. 9 schematically shows an embodiment of a connection between panels.

An inner side panel 10 provided with a such overmoulded zone 11 at the edge and another inner side panel 10 provided with a similar overmoulded zone 11 at the edge can be connected by welding the overmoulded zones 11 at the edges together as illustrated in FIG. 9.

In a further embodiment, the overmoulding of two plates being inner side panels 10 may take place at the assembly stage, so the need for separate welding process is eliminated. This is illustrated in FIG. 10 showing two inner side panels 10 overmoulded in such a way that the overmoulding zones 11 of both inner side panels 10 are at least partially embedded by the overmoulding material 14.

Here the overmoulding zones 11 of the panels 10 overlaps each other, at least partially.

Figure 10:
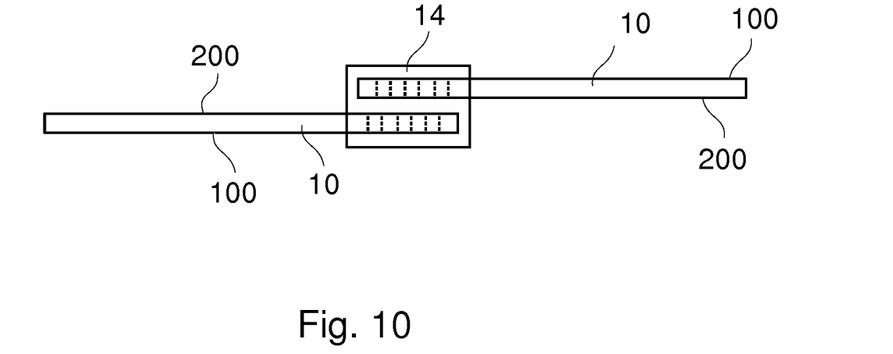
FIG. 10 schematically shows another embodiment of a connection between panels.

The panels mentioned in relation to FIGS. 9 and 10 can also be two roof panels 40.

Figure 11:
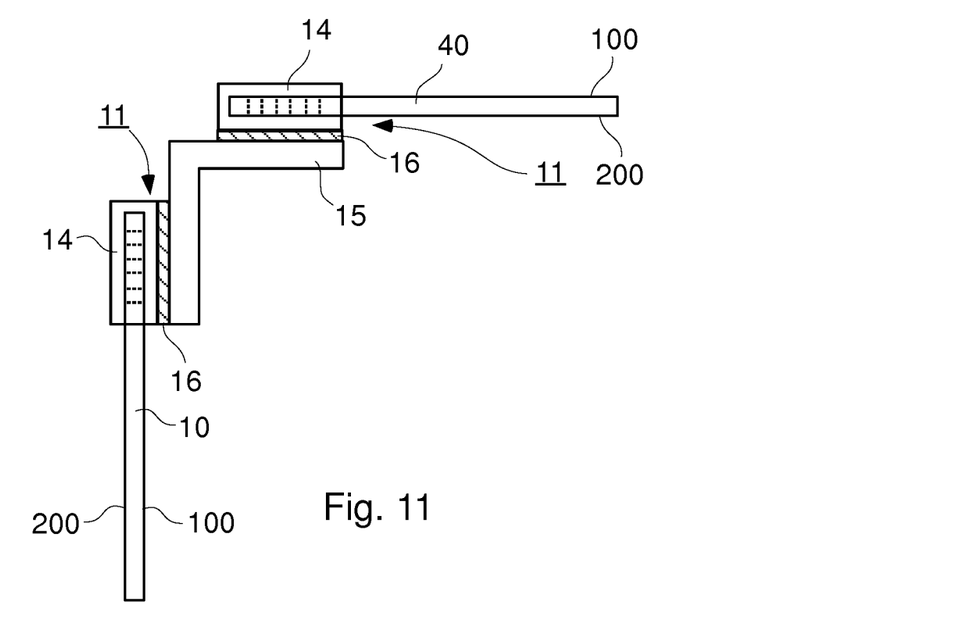
FIG. 11 schematically shows an embodiment of a corner connection.
Figure 12:
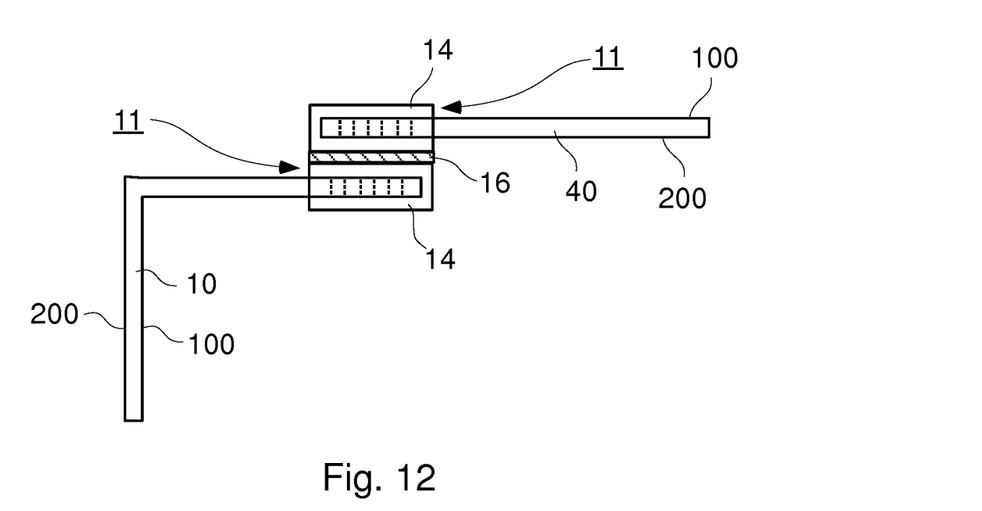
FIG. 12 schematically shows another embodiment of a corner connection.

An inner side panel 10 provided with a such overmoulded zone 11 at the edge and a roof panel 40 provided with a similar overmoulded zone 11 at the edge can be connected by welding the overmoulded zones 11 at the edges together as illustrated in FIG. 12 in case one of the inner side panel 10 or the roof panel 40 is provided with a substantially 90° bend or by use of a corner profile 15 as mentioned above, which corner profile 15 is welded to the overmoulding zone 11 at the roof panel 40 as well as to the overmoulding zone 11 at the inner side panel 10, which is illustrated in FIG. 11.

When using welding as a joining method, the corner profile 15 and the overmoulded material 14 is heated locally, a welding zone is established and the two materials will be joined together forming a weld or a welding seam 16.

In an embodiment, the overmoulding material 14 is a polymer.

Welding of polymer-to-polymer can be performed by alternative standard methods for welding polymer. In the above-described embodiments the preparation of parts by overmoulding the edges is separated from a process of assembly of the inner side panel 10 and the roof panel 40, which is an extra welding process at an assembly line. Welding of the polymer parts can be performed by use of resistance welding/fusion welding, where a conductive mesh is placed in between the two polymer parts where melting of the polymer is performed by heating up the mesh by electric current in the mesh.

Welding can also be carried out by use of other heat sources and by use of additional material or filler material.

Figure 13:
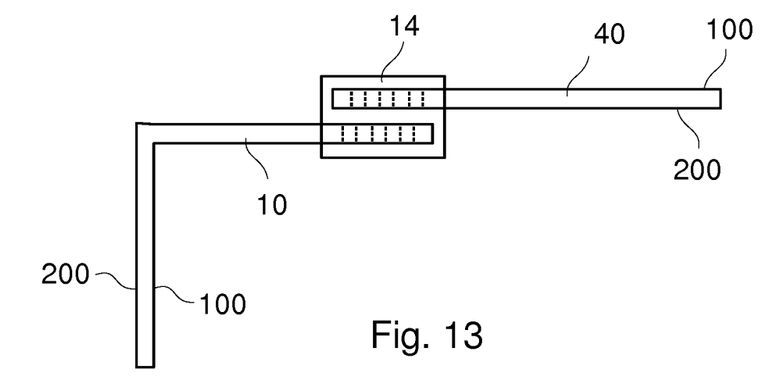
FIG. 13 schematically shows an alternative embodiment of a corner connection.

In a further embodiment, the overmoulding of two plates being an inner side panel 10 and a roof panel 40 may take place at the assembly stage, so the need for separate welding process is eliminated. This is illustrated in FIG. 13 showing the inner side panel 10 provided with a substantially 90° bend and overmoulded in such a way that the overmoulding zones 11 of both the inner side panel 10 and the roof panel 40 are at least partly embedded by the overmoulding material 14.

Figure 14:
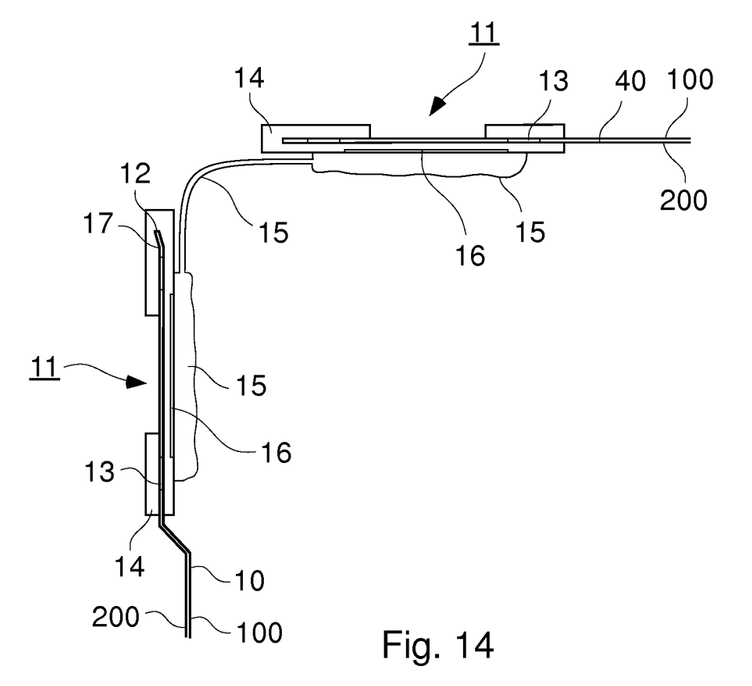
FIG. 14 schematically shows a corner connection assembly comprising an inner side panel, a roof panel and a corner profile.
Figure 15:
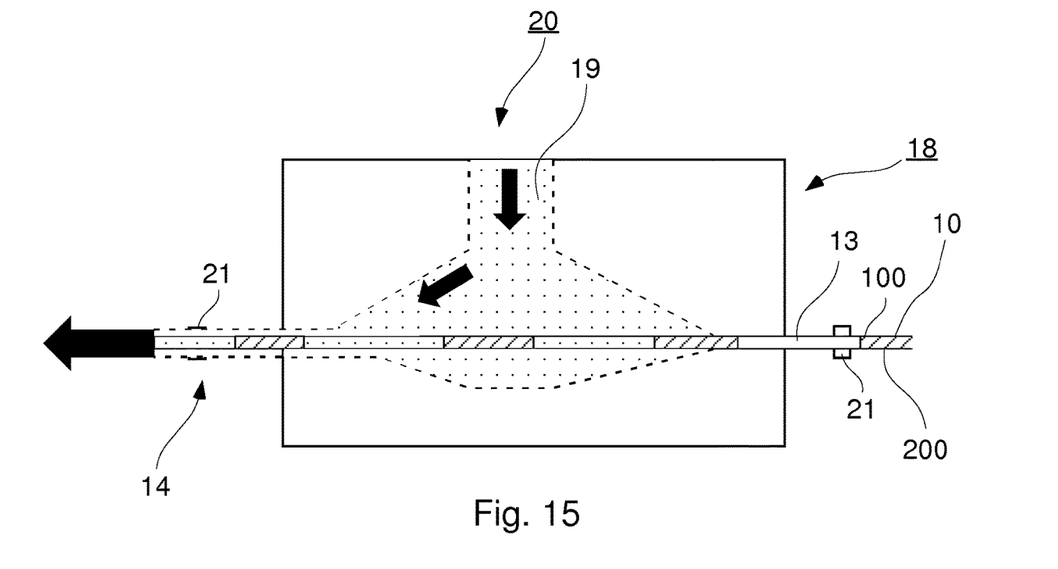
FIG. 15 schematically shows a simplified cross section of a side view of an extruder head for overmoulding a perforated plate or panel.
Figure 16:
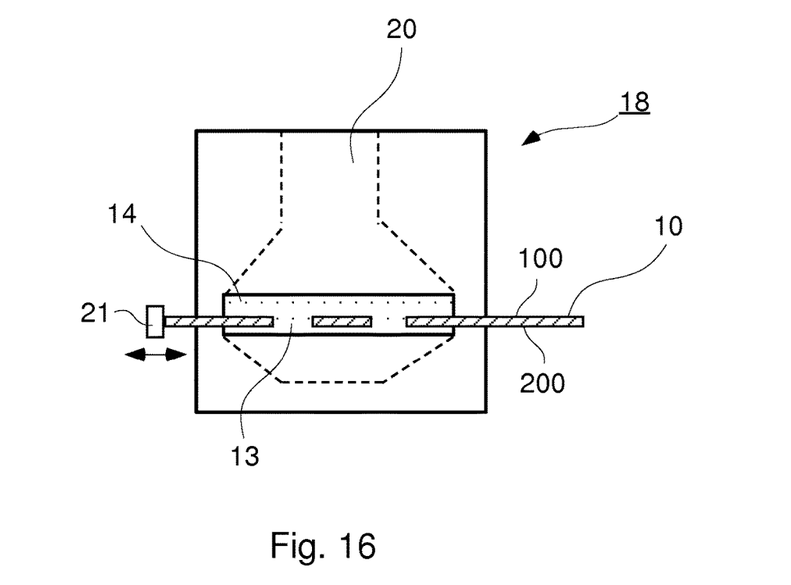
FIG. 16 schematically shows an end view from an exit side of the extruder head for overmoulding a perforated plate or panel.
Figure 17:
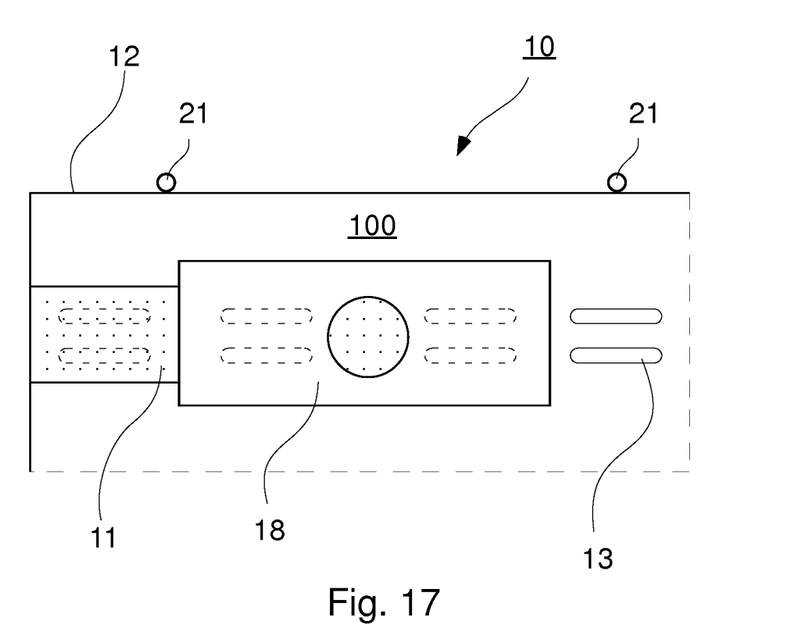
FIG. 17 shows a simplified schematic cross sectional top view of the extruder head for overmoulding a perforated plate or panel.
Figure 18:
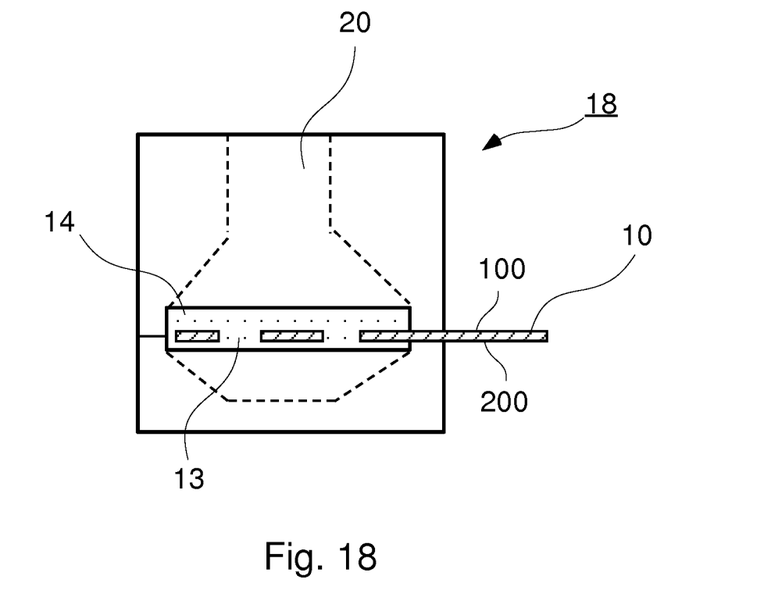
FIG. 18 schematically shows an end view from an exit side of the extruder head for overmoulding an edge of a perforated plate or panel.
Figure 19:
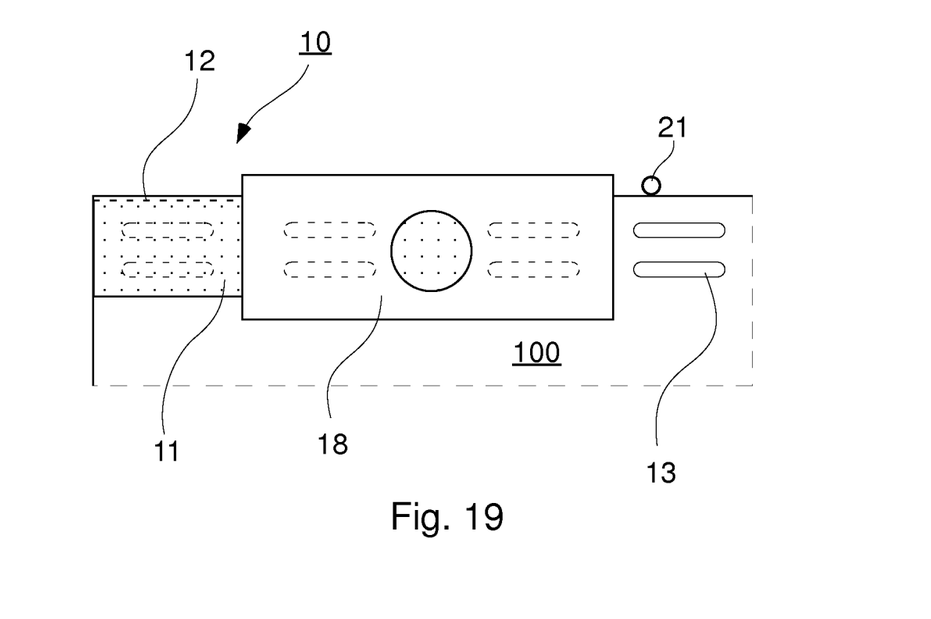
FIG. 19 shows a simplified schematic cross sectional top view of the extruder head for overmoulding an edge of a perforated plate or panel.

In an embodiment, as shown in FIG. 14, an inner side panel 10 is joined with a roof panel 40 by welding a corner profile 15 to the overmoulded zones 11 of the panels 10, 40. In this embodiment, the overmoulding material 14 is applied to the panels 10, 40 in such a way that the overmoulding material 14 forms a strip of material along each row of perforations 13 on the first side 100 of the panel 10, 40 and on the second side 200 of the panel 10 the overmoulding material 14 forms a single strip covering the overmoulding zone 11.

The inner side panel 10 and the roof panel 40 are connected by welding to the corner profile 15. The welding process in the different embodiments can be carried out by manual welding using a handheld heating source, by a robot or by use of resistance welding/fusion welding, where a conductive mesh is placed in between the two polymer parts being the overmoulding material 14 and the corner profile 15, where melting of the polymer is performed by heating up the mesh by electric current in the mesh placed where the welding seam 16 is to be established.

In an embodiment the connection between the overmoulding material 14 and the panel 10, 40 can be enhanced by providing a bend 17 to the edge 12 of the panel 10, 40. This bend 17 can be used alone or in combination with the perforations, further enhancing the connection between the overmoulding material 14 and the panels 10, 40.

Parameters having influence in relation to the strength of the connection is material properties for the panels 10, 40 and the properties for the polymer materials 14.

Another parameter having influence in relation to the strength of the connection is distribution pattern of holes 13 in the overmoulding zone 11 or perforated zone. A parameter describing a two dimensional view of the perforations 13 can be percentage of area of the panel 4, 10, which is removed when making the holes 13.

In case the panel 10, 40 is made of metal, an acceptable percentage of removed area will be in a range from 5% up to removed area of 90%, or more typical in the range from 10%-50%. At the lower end of the range, the connection becomes weaker due to a limited cross-sectional area of polymer material 14 caused by low number of holes or perforations 13.

Another parameter describing the distribution of perforations 13 in a lengthwise direction or row having influence on the strength of the connection, is a relationship $\alpha=l/p$, where l is a distance between two neighbouring holes 13 of the perforations in a row and p is the period for the perforated pattern, also being a distance between centres of two neighbouring holes 13 in a row.

Figure 5:
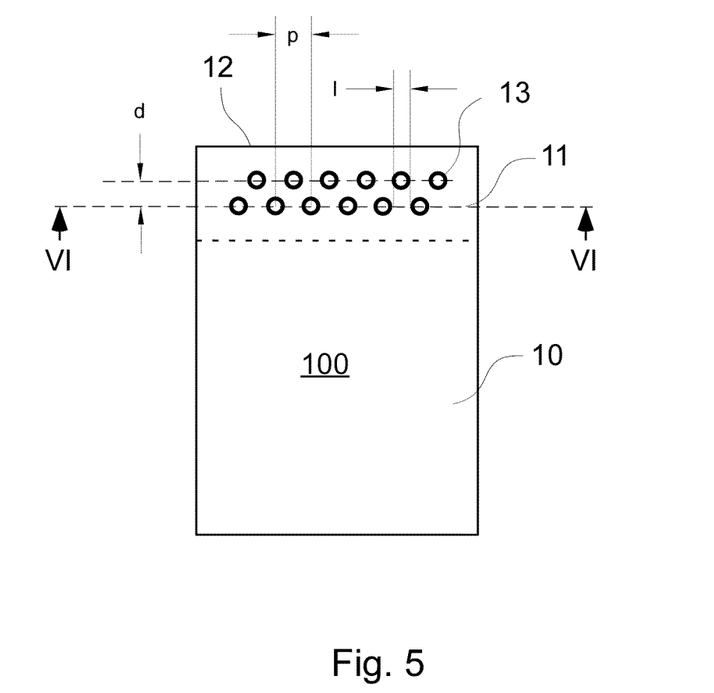
FIG. 5 shows the panel of FIG. 4 indicating distances between holes.
Figure 6:
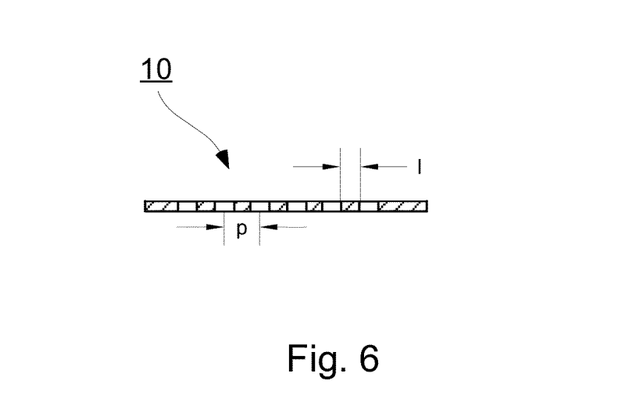
FIG. 6 shows a cross section along line VI-VI of FIG. 5.
Figure 7:
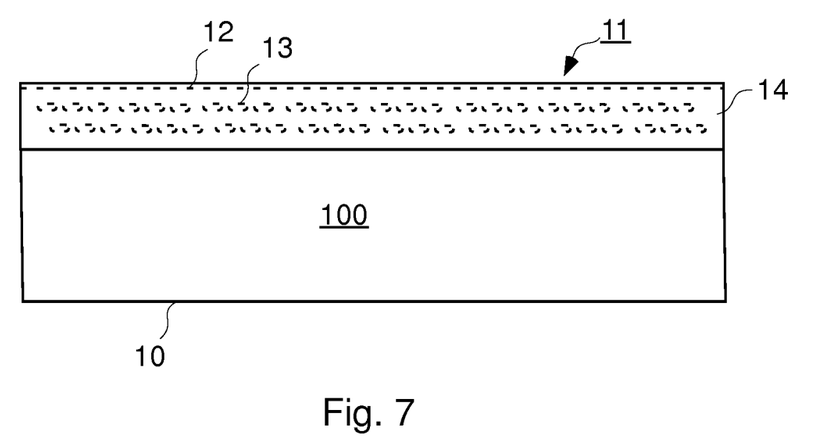
FIG. 7 shows an inner panel indicating an overmoulded zone covering the perforations along an edge.

A distance between lines going through centres of holes 13 in two neighbouring rows is d. These parameters is shown in FIGS. 5 and 6. The smaller this relationship $\alpha=l/p$ is, the more is lost in strength of the plate in relation to a non-perforated panel 10, 40. A value for a may be in a range of 0.3 up to 0.9, and more typical in the range 0.5-0.7.

It is an aim to adapt the strength of the polymer material 14 in the holes 13 to be balanced with the strength of the perforated panel 10, 40.

As an example can be mentioned that for a panel 10, 40 made in a high strength material such as High Grade Stainless Steel, the value for a may be relative low as the relative small cross-sectional area of steel needed to outbalance the strength of the significant larger cross-section of the polymer material 14, however for an aluminium panel 10, 40, the value for a need to be 0.5 or higher for the cross-section of aluminium plate material 10, 40 to outbalance the polymer material 14.

Thickness dimension of the overmoulded polymer 14 is also one factor to consider, the thicker the layer 14 is on the side opposite to the welding 16, the higher strength the connection may have.

As an example, for panels 10, 40 of material thickness in the range of 0.5 mm to 1.5 mm and with dimensions for the perforated holes 13 in the range of 5 mm to 15 mm, the thickness of the polymer 14 on the side opposite to the welding connection 16 can be in the range of 0.5 mm to 5 mm and more typically 1 mm to 3 mm.

The strength of the corner connection 8, 9 depends on the material properties for the polymer material chosen and of the size and shape of the perforations 13, being circular holes, polygonal, quadrilateral or rectangular holes or combinations of these shapes of holes 13. Typical suitable polymer materials are polypropylene(PP) and PP blends, however many alternative types of polymer and polymer blends can be chosen for a specific design to fulfil the requirements for strength, visual impression, biocompatibility, regulations for food transport equipment etc. By optimization of the area of the perforations 13, the shapes of the perforations 13 and the properties of the polymer material, the strength of the new corner connection typically exceeds the strength of a comparable rivet based connections by factor of 2 to 5.

A cooling container e.g. a refrigerated cargo box of a truck or trailer, a railway container, an intermodal container or a shipping container comprising panels to be connected can be assembled according to a method where at least one panel 10, 40 is provided with an overmoulding zone 11 comprising a layer of overmoulding material 14 covering at least partially a first side 100 and a second side 200 of the panel 10, 40.

In an embodiment of the method the overmoulding material 14 flows through holes 13 in the panel 10, 40 during application and is distributed on each side of the panel 10, 40.

In an embodiment of the method, perforations or holes 13 are provided to the overmoulding zone 11 before overmoulding the zone 11 with the overmoulding material 14.

In an embodiment of the method an inner side panel 10 and a roof panel 4 are joined to a corner profile 15 by gluing or plastic welding.

In an embodiment of the method one of an inner side panel 10 or a roof panel 40 is bended before or after the panels are provided with a layer of overmoulding material 14 to provide parallel and overlapping overmoulding zones 11 before joining the inner side panel 10 and the roof panel 40 by gluing or plastic welding.

In an embodiment, the method comprises bending one of an inner side panel 10 or a roof panel 40 providing parallel and overlapping overmoulding zones 11 before joining the inner side panel 10 and the roof panel 40 by overmoulding.

The cost for production of the new corner connection 8, 9 is significantly reduced compared to similar comparable alternative corner connections, as the material costs is reduced by use of polymer only for the connection and as the cost for assembly of the corner connection is reduced. The reduced cost for assembly is much related to the reduced number of parts to be assembled and to the fact that the polymer overmoulding process may be a relative simple direct extrusion process with limited use of labour hours.

Performing the overmoulding process by direct extrusion of the overmoulding material 14 together with the edge 12 and overmoulding zone 11 of the panel 10, 40 being led through an extrusion crosshead 18.

Such extruder equipment and extrusion process is standard equipment also typically used for welding polymer parts together. Therefore, only shape of internal flow channels in the extruder head and shape of exit of the extruder head has to be adapted specifically for actual design/shape of the applied overmoulding material 14 (layers of polymer) on to the overmoulding zone 11 of the inner side panel 10. Examples of an extruder crosshead 18 is shown in FIGS. 15-19. In the Figures and below an overmoulding of an inner side panel 10 is described, but the process is the same for applying of overmoulding material 14 to a roof panel 40. The extruder head 18 is typically a standard base component of PTFE in which the shape of the extruded profile is machined. Known profiles to be overmoulded in such an extruder head is wires and rods being completely overmoulded embedding the wires or rods.

The overmoulding process can be carried out using an extruder head 18 for applying a layer of a fluid overmoulding material to the panel 10, 40, where the extruder head 18 comprises an inlet 20 for supply of overmoulding mass 19 to the extruder head 18 and a chamber for applying overmoulding material 14 to an elongate member, where the extruder head 18 is provided with an entrance formed to receive a plate or panel 10, 40 on which panel 10, 40 a layer of overmoulding mass 19 is applied, forming a strip of overmoulding material 14 on the panel 10, 40.

In an embodiment, the extruder head 18 is provided with one or more guides 21 for guiding the panel during application of a strip of overmoulding material 14 on the panel 10, 40.

The guide 21 can be a plane edge on which the edge 12 of the panel 10, 40 can be guided when passing through the extruder head 18. The guide can also be a pair of pins or rollers. The guide can also be adjustable as indicated by an arrow in FIG. 16. The position of the guide determines where on the panel 10, 40 the strip of overmoulding material 14 will be placed. The guide 21 can position the panel 10, 40 in such a way that the strip of overmoulding material 14 is placed aligned in relation to the row or rows of holes 13 in the panel 10, 40.

In an embodiment of the extruder head 18, the strip of overmoulding material 14 is applied around an edge 12 of the panel 10, 40.

When overmoulding the edge 12 of the panel 10, 40, one or more guides 21 is placed before the panel 10, 40 reaches the entrance of the extruder head 18. Another guide (not shown) can be placed along a moving path of the panel 10, 40 in a suitable distance from the outlet of the extruder head 18 so the strip or edge of overmoulded material 14 is cooled down enough to let the overmoulded material 14 cure sufficiently not to let the guide scrape off the overmoulded material 14 from the panel 10, 40.

In this embodiment, the guide 21 can be used to determine the thickness of the overmoulded material 14 provided to the edge 12 of the panel 10, 40.

In an embodiment of the extruder head 18 the strip of overmoulding material 14 is applied on a first side 100 of the panel 10, 40 through holes 13 in the panel 10, 40 and forming a strip of overmoulding material 14 on a second side 200 of the panel 10, 40.

When applying the overmoulding material 14 to the inner side panel 10 using the extruder head 18 the edge 12 and the overmoulding zone 11 of the panel 10 is introduced into the head 18 and an overmoulding mass 19 is filled into the extruder head 18 via an inlet 20. Hereafter the overmoulding mass 19 leaves the extruder head 18 through an outlet together with the panel 10 forming the strip of overmoulding material 14. When the material for overmoulding enters the extruder head 18 in fluid condition it flows through the holes 13 in the panel 10 and adheres to both sides 100, 200 of the panel 10. The same apply if the panel is a roof panel 40 or if the panel is an outer panel.

Overmoulding a zone 11 or a part of a panel 10, 40 with a layer of polymer 14 on the two sides 100, 200 as well as in the holes 13 of the panel 10, 40 forms a mechanical connection between the strip of polymer material 14 and the panel 10, 40. Hereby the inner side panel 10 and the roof panel 40, even if they are metal plates, can be connected mechanically by welding together the two strips of polymer 14. The two polymer strips 14 can be directly welded together or an extra polymer component/an extra polymer profile can be interconnected between the two polymer strips. An extra polymer profile can be a corner profile 15.

The inner side panel 10 and the roof panel 40 can also be made of polymer plates or composite plates, however the possible ranges for strength and dimensions and shapes of perforations 13 need to be adapted to the actual type of material and thickness of plates.

The function of the assembly is to mechanically connect the edges 12 of two plates being the inner panels 10, 40 of a container 1 to each other, this mechanical connection having the needed strength and at same time the needed tightness and being hygienic optimal. Hereby the panels 10, 40 are mechanically connected to each other and at the same time, the connection is tight, meaning that there is no need for an additional seal or gasket.

The solution is also achieved by an intermodal container, truck or railway wagon comprising a pair of side walls, a ceiling, a floor, an end wall and a door opening, the side walls comprising wall panels and the ceiling comprising roof panels, where the wall panels 10 and/or the roof panels 40 are joined together by a connection according to embodiments mentioned above.

The solution is also achieved by a method of assembling a container by use of the method according to one or more embodiments mentioned above.

The uniqueness of the polymer based corner connection 8, 9 is that the welded polymer brings high degree of tightness and a smooth surface, which is easy to clean and is hygienic, and at same time the relative limited thickness of the overmoulded polymer strip 14 brings strength and toughness needed for the corner connection 8, 9.

Regarding tightness, the performance of the connection depends among other things on the type of polymer chosen, as soft polymer will tend to tighten better against the panels than hard polymer.

Various types of adhesive polymers, either with additional gluing components such as variants of Thermo Plastic Elastomers (TPE) or with additional additives for vulcanizing to the surface of the plates such as Thermo Plastic Vulcanize (TPV) can be used.

What is claimed is:

1. A cooling container for a refrigerated cargo box of a truck or trailer, a railway container, an intermodal container or a shipping container comprising:
   at least two connected panels, wherein each connected panel comprises an overmoulding zone arranged along an edge of the panel and a layer of overmoulding material which is placed on the panel along the edge of the panel and at least partially covers a first side and an opposing second side of the panel,
   wherein the over-moulding zone of each connected panel comprises one or more perforations and the overmoulding material on the first side of the panel merges with the over-moulding material on the second side of the panel along the edge and through the one or more perforations, and
   wherein the over-moulding zone of one panel of the at least two connected panels is welded to the overmoulding zone of another panel of the at least two connected panels.

2. A cooling container according to claim 1, where the overmoulding material is a polymer.

3. A cooling container according to claim 1, where the one or more perforations comprise a pattern of elongate holes.

4. A cooling container according to claim 1, where the at lone or more perforations comprise a pattern of circular holes.

5. A cooling container according to claim 4, where the holes are arranged in more than one row.

6. A cooling container according to claim 1, where at least one panel of the at least two connected panels is made of metal.

7. A cooling container according to claim 1, where at least one panel of the at least two connected panels is made of a polymer material.

8. A cooling container according to claim 1, where at least one panel of the at least two connected panels is made of a composite material.

9. A cooling container according to claim 1, wherein the at least two connected panels comprise a side panel and a roof panel, and the connection is a corner connection between the side panel and the roof panel.

10. An intermodal container, truck or railway wagon comprising a pair of side walls, a ceiling, an end wall, a floor and a door opening, the side walls comprising wall panels and the ceiling comprising roof panels, where the wall panels and/or the roof panels are joined together by the connection according to claim 1.

11. A method of assembling a cooling container for a refrigerated cargo box of a truck or trailer, a railway container, an intermodal container or a shipping container, the cooling container comprising at least two panels to be connected, where each panel comprises an over-moulding zone arranged along an edge of the panel and wherein the over-moulding zone of each panel comprises one or more perforations, the method comprising:

providing a layer of over-moulding material to each panel to be connected, where said layer of over-moulding material is provided along the edge of the panel to at least partially cover a first side and an opposing second side of the panel, wherein the over-moulding material on the first side of the panel merges with the over-moulding material on the second side of the panel along the edge and through the one or more perforations; and connecting the at least two panels by welding the over-moulding zone of one panel of the at least two panels to the over-moulding zone of another panel of the at least two panels.

12. The method according to claim 11, where the one or more perforations are provided to the overmoulding zone before overmoulding the zone with the overmoulding material.

13. The method according to claim 11, wherein the at least two panels comprise an inner side panel and a roof panel, and where the connection of that at least two panels is a corner connection of the inner side panel and the roof panel.

* * * * *